United States Patent [19]

Windgassen

[11] 3,951,639
[45] Apr. 20, 1976

[54] PROCESS FOR INTRODUCING ZINC MICRONUTRIENTS INTO LIQUID FERTILIZERS

[75] Inventor: Richard J. Windgassen, East Chicago, Ind.

[73] Assignee: Standard Oil Company, Chicago, Ill.

[22] Filed: Jan. 28, 1974

[21] Appl. No.: 437,138

Related U.S. Application Data

[63] Continuation-in-part of Ser. No. 321,924, Jan. 8, 1973, Pat. No. 3,796,559, which is a continuation of Ser. No. 129,109, March 29, 1971, abandoned, which is a continuation-in-part of Ser. No. 867,905, Oct. 20, 1969, abandoned.

[52] U.S. Cl. .......................................... 71/27; 71/1; 71/6 HC; 71/6 HE
[51] Int. Cl.² .......................................... C05D 9/02
[58] Field of Search ........ 71/32, 6 HC, 6 HE, 6 HF, 71/1, 27; 260/606.5 P

[56] References Cited
UNITED STATES PATENTS

| | | | |
|---|---|---|---|
| 2,770,540 | 11/1956 | Vierling | 71/1 X |
| 3,186,828 | 6/1965 | Baarson et al. | 71/6 HE |

*Primary Examiner*—Frank A. Spear, Jr.
*Assistant Examiner*—Ferris H. Lander
*Attorney, Agent, or Firm*—Edwin C. Lehner; Arthur G. Gilkes; William T. McClain

[57] ABSTRACT

Zinc particulate compositions precoated with aliphatic amines. salts of such amines or mixtures thereof, when added to phosphate-containing liquid fertilizers, avoid lumping and caking which otherwise occurs when uncoated zinc compositions are added to such liquid fertilizers.

7 Claims, No Drawings

PROCESS FOR INTRODUCING ZINC MICRONUTRIENTS INTO LIQUID FERTILIZERS

CROSS-REFERENCE TO RELATED APPLICATIONS

This is a continuation-in-part application of Ser. No. 321,924, filed Jan. 8, 1973, now U.S. Pat. No. 3,796,559 which is a continuation application of Ser. No. 129,109, filed Mar. 29, 1971, now abandoned, which in turn is a continuation-in-part application of Ser. No. 867,905, filed Oct. 20, 1969, now abandoned.

BACKGROUND OF THE INVENTION

Commercially available liquid fertilizers include the primary plant nutrients, nitrogen, phosphorus and potassium dissolved or suspended in water. Besides these primary nutrients, the soil also requires smaller amounts of micronutrients such as zinc, manganese, iron and copper. Particulate zinc compositions are difficult to blend with liquid fertilizers, because these zinc compositions agglomerate and form lumps and cakes which frequently adhere to the mixing vessel. With vigorous agitation the lumps can be broken apart and dispersed or dissolved in the fertilizer. This, however, is both an expensive and time consuming operation that desirably should be eliminated.

SUMMARY OF THE INVENTION

I have found that particulate zinc compositions precoated with aliphatic amines, or mixtures thereof can be added to and dispersed in liquid phosphate-containing fertilizer without lumping or caking. Thus vigorous and excessive agitation is avoided with attendant reduction in equipment wear and time required to make the fertilizer. Adding the coating material to the liquid fertilizer instead of precoating the zinc composition does little to reduce lumping. I have also found that materials such as stearic acid, paraffin wax and motor oil have no appreciable effect in reducing lumping and caking.

LIQUID FERTILIZER

Most liquid fertilizer contains at least about 30 weight percent plant nutrient such as compounds of nitrogen, phosphorus and potassium. The phosphorus and potassium concentrations are conventionally expressed as oxides. The proportions of nitrogen, phosphorus and potassium vary, as for example, 1:1:1, 1:2:1, 1:3:1, 1:3:0, 2:3:1, 4:3:1, etc.

Sources of nitrogen suitable for use in the preparation of the base fertilizer include ammonia, urea, ammonium nitrate, ammonium sulfate and mixtures thereof. Ammonia may be used in either aqueous or anhydrous form. Urea, ammonium nitrate and ammonium sulfate may be used in solid form or as an aqueous slurry or solution.

Phosphatic compounds suitable for use in preparing fertilizers include concentrated aqueous phosphoric acid solutions, monoammonium phosphates, diammonium phosphates, or mixtures thereof. Ammonium phosphates can be used in either solid or aqueous form. Superphosphoric acid prepared by either the "furnace process" or "wet process" is a preferred source.

Suitable sources of potassium are potassium salts such as potassium chloride, potassium sulfate, potassium nitrate, and the like. Potassium chloride is the preferred source.

Liquid fertilizer may also include dispersed material. For example, clay is sometime added to the fertilizer to suspend particles of potassium chloride or the like. In addition to the zinc, other micronutrients such as iron, magnesium, manganese or other metals may be included. Sometimes herbicides and pesticides are also added to the fertilizer.

PARTICULATE ZINC COMPOSITIONS

Suitable sources of zinc include zinc sulfate (preferably the monohydrate), zinc oxide, zinc carbonate, or free metallic zinc particles. Generally, these zinc compositions are powders having particles ranging in size from about 25 to about 1000 microns. In most instances they are used in liquid fertilizers in concentrations ranging from about 0.05 to about 1.0 weight percent zinc, based on total fertilizer weight. This is normally considered an agronomically active amount, but this amount can vary somewhat depending upon the soil conditions.

COATING MATERIALS

The materials used to pre-coat the solid particulate zinc materials for use in the present invention are aliphatic monoamines and diamines, having from 6 to 40 carbon atoms in the aliphatic moiety, selected from the group consisting of (a) primary-, secondary-, and tertiary-aliphatic amines, (b) alpha, omega-diaminoalkanes, (c) N-aliphatic 1,3 propylene diamines, (d) salts of said amines and (e) mixtures thereof. The group (a) amines are represented by the formula

wherein R is an unsubstituted straight or branched chain aliphatic group, and $R_1$ and $R_2$ are hydrogen or R, and the total number of carbon atoms in the formula is from 6 to 40. The group (b) diamines are represented by the formula $H_2N-(CH_2)_x-NH_2$ wherein $x$ is from 6 to 40. The group (c) diamines are represented by the formula $R-NH(CH_2)_3NH_2$ wherein R is an aliphatic group as defined above, and the total number of carbon atoms in the formula are 6 to 40. Examples of suitable aliphatic amines are laurylamine, oleylamine, stearylamine, n-tetradecylamine, n-tetracontylamine, n-hexylamine, N, N-dimethyl dodecylamine, 2-ethylhexylamine, tri-n-octylamine, di-n-nonylamine, 1,8,-diaminooctane, and 1,11-diaminoundecane. Armour Industrial Chemical Company also sells a number of suitable aliphatic amines such as Duomeen O (oleic 1,3-propylenediamine), Duomeen S (soya 1,3-propylenediamine), Armeen 18D (n-octadecylamine), and Armoflow 610.

I have also found that the salts of the aliphatic amines are also suitable coating materials, and have tested oleylamine acetate and oleylamine hydrochloride on zinc sulfate (monohydrate). I have found such salts are as effective as the oleylamine itself. The oleylamine acetate and oleylamine hydrochloride were applied to the zinc sulfate in a solution of methylene chloride and ethyl ether.

If the amine has the general formula $R_3N$, where R may represent the same or different aliphatic groups or aliphatic and hydrogen groups, the following salts are suitable:

1. $(R_3NH)^+ X^-$ (monovalent anion): $X^- = NO_3^-$ (nitrate), $Cl^-$ (Chloride), $Br^-$ (bromide), $H_2BO_3^-$ (borate), $CH_3COO^-$ (acetate), $CH_3(CH_2)_4COO^-$ (hexanoate).
2. $(R_3NH)_2^+X^=$ (divalent anion): $X^= = SO_4^=$ (sulfate), $HPO_4^=$ (dibasic phosphate), etc.
3. $(R_3NH)_3^+ X^{\equiv}$ (trivalent anion): $X^{\equiv} = PO_4^{\equiv}$ (tribasic phosphate), etc.
4. Amine salts of polymeric acids, such as polyacrylic acid or poorly characterized acids, like lignosulfonic acids.
5. Complexes of zinc salts such as $(R_3N)_yZn^{++}X^=$ or $(R_3N)_yZn^{++}X_2^-$, etc., where $y = 1$ to 4.

Converting the amines to salts will in general change their solubility characteristics, and new solvent systems might have to be employed for their use in coating the zinc salts.

Conventional coating techniques can be employed in precoating zinc particulate compositions. For example, coating materials may be dissolved in a suitable solvent, with the solid particulate zinc materials then being mixed with this solution. Or, the coating material and the particulate composition may be mixed together directly. If the coating material is first dissolved in the solvent, the solvent should not react with the particulate composition. Suitable solvents are, for example, heptane, xylene, petroleum distillates, ethyl ether, dibutyl ether, trichloroethylene, and methylene chloride.

The amount of coating material is not critical. As little as 0.005 weight percent coating material, based on the weight of particulate composition, has been effective. Normally, the amount of coating material ranges from about 0.05 to about 1.50 weight percent, based on weight of particulate composition. With solid amines, the addition of excessive amounts (about 2 weight percent) leaves an obvious residue in the fertilizer. With some liquid amines, using more than about 1 weight percent tends to make the zinc particulate composition stick together. However, different coating materials behave differently, and the amounts employed will therefore vary.

ADDING METALLIC ZINC PARTICLES TO LIQUID FERTILIZERS

While investigating ways to introduce zinc micronutrients into base liquid fertilizer, I found that metallic zinc particles can be added directly to the base fertilizer. When this is done some caking occurs and hydrogen gas is liberated. Since hydrogen gas and air form an explosive mixture, it is necessary to suppress the formation of hydrogen gas. This can be achieved if the fertilizer includes an oxidizing agent in an amount sufficient to react with the expected quantity of hydrogen ordinarily produced.

Nitrate salts, nitrite salts, hydroxylamine or nitroparaffins are examples of effective oxidizing agents for suppressing the formation of hydrogen. The nitrate and nitrite salts and hydroxylamine are reduced to ammonia which dissolves in the fertilizer. The nitroparaffins, however, are reduced to alkyl amines. Thus if the zinc particles are first precoated with nitroparaffins containing more than 6 carbon atoms, it is possible to suppress hydrogen formation and simultaneously prevent lumping. Nitroparaffins such as nitroethane, 2-nitrobutane, etc., up to about nitrohexane, could be used as hydrogen acceptors while nitroparaffins from about 6 carbon atoms up to about 40 carbon atoms could be used in smaller amounts as coating agents.

Alternately, free metal particles of zinc can be precoated with aliphatic amines so that caking is avoided. Precoating, however, does not seem to increase the rate at which the metal is dissolved in the fertilizer, but adding ammonia to the mixture does increase this dissolving rate. Preferred zinc particle size ranges between about 50 and about 100 microns. Such precoated zinc particles are dissolved in the fertilizer which includes sufficient oxidizing agent to suppress the formation of hydrogen gas.

DESCRIPTION OF PREFERRED EMBODIMENTS

EXAMPLE 1

Forty grams of zinc sulfate monohydrate and 0.5 grams of Armeen 18D were mixed together and warmed at 80°C for about 1 hour in an Erlenmeyer flask. The contents of the flask were allowed to cool and then mixed with 500 grams of commercial 7-24-3 liquid fertilizer. The coated zinc sulfate tended to float on the surface of the fertilizer. Very little lumping was observed. The zinc sulfate was completely dissolved in 15 minutes as opposed to 1 hour for uncoated zinc sulfate. The uncoated material also formed lumps and required a great deal of agitation to dissolve.

EXAMPLE 2

This example was substantially the same as example 1 except di-n-nonylamine was substituted for the Armeen 18D.

EXAMPLE 3

This example was substantially the same as example 1 except 0.4 grams of tetradecylamine was substituted for the Armeen 18D.

EXAMPLE 4

This example was substantially the same as example 1 except n-hexylamine was substituted for the Armeen 18D.

EXAMPLE 5

This example was substantially the same as example 1 except 1,8 diaminooctane was substituted for the Armeen 18D.

EXAMPLE 6

This example was substantially the same as example 1 except 1,11 diaminoundecane was substituted for the Armeen 18D.

EXAMPLE 7

This example was substantially the same as example 1 except trioctylamine was substituted for the Armeen 18D.

EXAMPLE 8

This example was substantially the same as example 1 except Duomeen O was substituted for the Armeen 18D. The Duomeen O was very effective.

EXAMPLE 9

With gentle mixing, 50 grams of zinc oxide and 0.2 grams of the Armeen 18D were blended together and heated at about 120°C for about 2 minutes. Six grams of this precoated zinc oxide was then dissolved in 300 grams of commercially available 7-24-3 liquid fertilizer. The precoated zinc oxide floated on the liquid fertilizer before going into the solution, which took about 10 minutes. Precoated zinc oxide showed no tendency to lump or cake.

EXAMPLE 10

This example was substantially the same as example 1 except zinc carbonate was substituted for zinc sulfate. Zinc carbonate effervesces in the liquid fertilizer, and carbon dioxide evolves. The evolution of the carbon dioxide impairs caking in the early stages of mixing; however, precoated zinc carbonate dissolves faster than uncoated zinc carbonate, and caking in the latter stages of mixing is avoided.

EXAMPLE 11

Five hundred grams of 3-10-8 liquid fertilizer, 30 milliliters of 15 molar ammonium hydroxide, and 10 milliliters of 28-0-0 ammonium nitrate and urea solution (38.8 weight percent ammonium nitrate) were mixed together to give a solution of pH 8.7. With stirring, 5.0 grams of zinc dust (particles ranging in size from about 50 to about 100 microns) was added to the solution. The zinc particles dissolved in about one and one-half minutes. No hydrogen evolved, but a small cake formed and stuck to the bottom of the reaction vessel.

EXAMPLE 12

This example is substantially the same as example 11 except zinc powder was first precoated with about 0.2 weight percent oleylamine. This avoided caking.

I claim:

1. In the preparation of zinc-containing liquid phosphate-containing fertilizers which comprises incorporating by admixing and dissolving particulate solid zinc-containing material of the group consisting of zinc sulfate, zinc oxide, zinc carbonate and metallic zinc in a liquid phosphate-containing fertilizer, the improvement comprising incorporating said zinc material that has been coated with from about 0.005 to about 2 wt. percent of a coating material having from 6 to 40 carbon atoms selected from the group consisting of (a) primary-, secondary-, and tertiary-aliphatic amines, (b) alpha, omega-diaminoalkanes, (c) N-aliphatic 1,3-propylenediamines, (d) salts of said amines and (e) mixtures thereof.

2. The process of claim 1 wherein said coating material is selected from the group consisting of n-hexylamine, tetradecylamine, n-octadecylamine, oleylamine, di(n-nonyl) amine, trioctylamine, 1,8-diaminooctane, 1,11-diaminoundecane and N-oleic 1,3-propylenadiamine.

3. The process of claim 1 wherein said zinc-containing material is zinc sulfate.

4. The process of claim 3 wherein said coating material is selected from the group consisting of n-hexylamine, tetradecylamine, n-octadecylamine, di-(n-nonyl) amine, trioctylamine, 1,8-diaminooctane, 1,11-diaminoundecane and trioctylamine.

5. The process of claim 1 wherein said zinc-containing material is zinc oxide, and said coating material is n-octadecylamine.

6. The process of claim 1 wherein said zinc-containing material is zinc carbonate, and said coating material is n-octadecylamine.

7. The process of claim 1 wherein said zinc-containing material is metallic zinc, and said coating material is oleylamine.

* * * * *